(12) United States Patent
Zwebner et al.

(10) Patent No.: US 11,314,827 B2
(45) Date of Patent: Apr. 26, 2022

(54) DESCRIPTION SET BASED SEARCHING

(71) Applicant: Houzz, Inc., Palo Alto, CA (US)

(72) Inventors: Ofir Zwebner, Palo Alto, CA (US); Xin Zheng, Palo Alto, CA (US)

(73) Assignee: Houzz, Inc., Palo Alto, CA (US)

( * ) Notice: Subject to any disclaimer, the term of this patent is extended or adjusted under 35 U.S.C. 154(b) by 295 days.

(21) Appl. No.: 16/554,087

(22) Filed: Aug. 28, 2019

(65) Prior Publication Data

US 2021/0064679 A1 Mar. 4, 2021

(51) Int. Cl.
| | | |
|---|---|---|
| *G06F 16/95* | (2019.01) | |
| *G06F 16/9535* | (2019.01) | |
| *G06F 3/0482* | (2013.01) | |
| *G06F 16/906* | (2019.01) | |
| *G06F 16/9538* | (2019.01) | |
| *G06F 40/30* | (2020.01) | |

(52) U.S. Cl.
CPC ........ *G06F 16/9535* (2019.01); *G06F 3/0482* (2013.01); *G06F 16/906* (2019.01); *G06F 16/9538* (2019.01); *G06F 40/30* (2020.01)

(58) Field of Classification Search
CPC . G06F 16/9535; G06F 16/906; G06F 16/9538
See application file for complete search history.

(56) References Cited

U.S. PATENT DOCUMENTS

| | | | |
|---|---|---|---|
| 2002/0062258 A1* | 5/2002 | Bailey | G06F 16/284 |
| | | | 705/26.1 |
| 2011/0184837 A1* | 7/2011 | Biro | G06Q 30/0603 |
| | | | 705/27.1 |
| 2019/0034528 A1* | 1/2019 | Lintz | G06F 16/745 |
| 2019/0361982 A1* | 11/2019 | Jacobson | G06F 16/24578 |
| 2020/0216089 A1* | 7/2020 | Garcia | B60K 35/00 |

* cited by examiner

*Primary Examiner* — Baoquoc N To
(74) *Attorney, Agent, or Firm* — Schwegman Lundberg & Woessner, P.A.

(57) ABSTRACT

A description-based search system can generate descriptions from item properties (e.g., item attribute) combinations. A user search request can be matched to one or more closest matching descriptions. The matching descriptions can be submitted as a query to a datastore, which returns results for display to the user. Additionally, the description based search system can link selected descriptions to pre-linked one or more pre-linked results.

20 Claims, 10 Drawing Sheets

DESCRIPTION SET BASED SEARCHING

TECHNICAL FIELD

Embodiments of the present disclosure relate generally to query processing and, more particularly, but not by way of limitation, to identifying item search results.

BACKGROUND

Some search engines find search results by analyzing a given query for meaning and context. Such systems require computationally complex algorithms that determine the query's meaning and context, and match the context and meaning to the most relevant search results. Not all data to be searched works well with these types of search engines, and applying computationally complex semantics-based algorithms to data not pre-configured for such algorithms can result in inefficiencies, such as computational overhead and irrelevant results.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
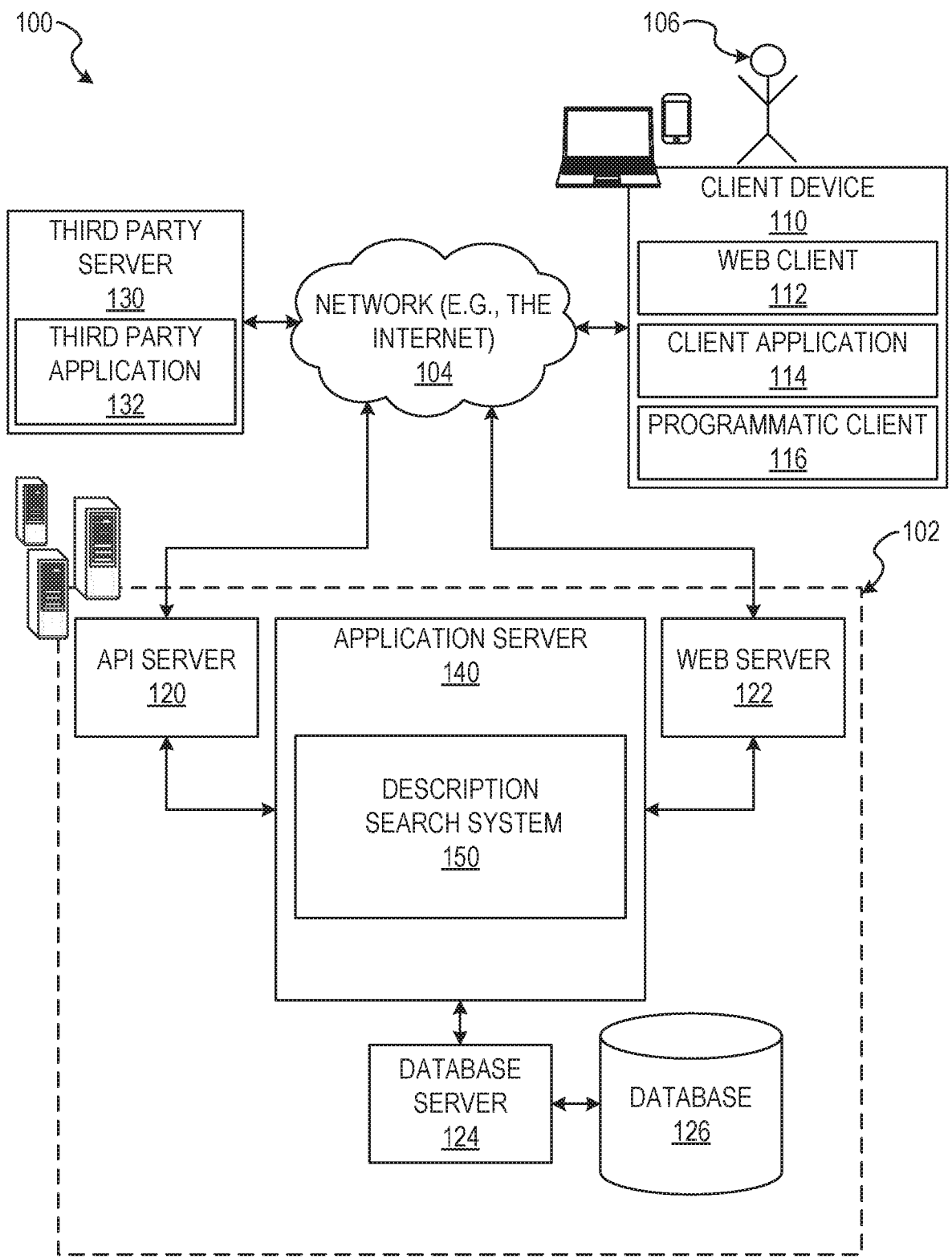
FIG. 1 is a block diagram illustrating a description search system implemented in a networked system, according to some example embodiments.

With reference to FIG. 1, an example embodiment of a high-level client-server-based network architecture 100 is shown. A networked system 102 provides server-side functionality via a network 104 (e.g., the Internet or a wide area network (WAN)) to one or more client devices 110. In some implementations, a user 106 interacts with the networked system 102 using the client device 110. FIG. 1 illustrates, for example, a web client 112 (e.g., a browser), a client application 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general-purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic system, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprise an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wi-Fi® network, a Worldwide Interoperability for Microwave Access (WiMax) network, another type of network, or any suitable combination thereof.

In some example embodiments, the client device 110 includes one or more applications (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the client application 114 includes various components operable to present information to the user 106 and communicate with the networked system 102.

The web client 112 accesses the various systems of the networked system 102 via the web interface supported by a web server 122. Similarly, the programmatic client 116 and client application 114 access the various services and functions provided by the networked system 102 via the programmatic interface provided by an Application Programming Interface (API) server 120.

Users (e.g., the user 106) comprise a person, a machine, or another means of interacting with the client device 110.

In some example embodiments, the user is not part of the network architecture 100, but interacts with the network architecture 100 via the client device 110 or another means. For instance, the user provides input (e.g., uses a touch screen input device or alphanumeric input device to generate a search query) to the client device 110 and the input is communicated to the networked system 102 via the network 104. In this instance, the networked system 102, in response to receiving the input from the user, communicates information (e.g., description results) to the client device 110 via the network 104 to be presented to the user. In this way, the user can interact with the networked system 102 using the client device 110.

The API server 120 and the web server 122 are coupled to, and provide programmatic and web interfaces respectively to, one or more application servers 140. The application server 140 can host a description search system 150, which can comprise one or more modules or applications, and which can be embodied as hardware, software, firmware, or any combination thereof. The application server 140 is, in turn, shown to be coupled to a database server 124 that facilitates access to one or more information storage repositories, such as a database 126. In an example embodiment, the database 126 comprises one or more storage devices that store information to be accessed by the description search system 150 or the client device 110. For example, a term dataset, pages, and descriptions in one or more languages are stored in the database 126, according to some example embodiments. Additionally, a third-party application 132, executing on a third-party server 130, is shown as having programmatic access to the networked system 102 via the programmatic interface provided by the API server 120. For example, the third-party application 132, utilizing information retrieved from the networked system 102, supports one or more features or functions on a website hosted by a third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the description search system 150) can also be implemented as standalone software programs, which do not necessarily have networking capabilities.

Figure 2:
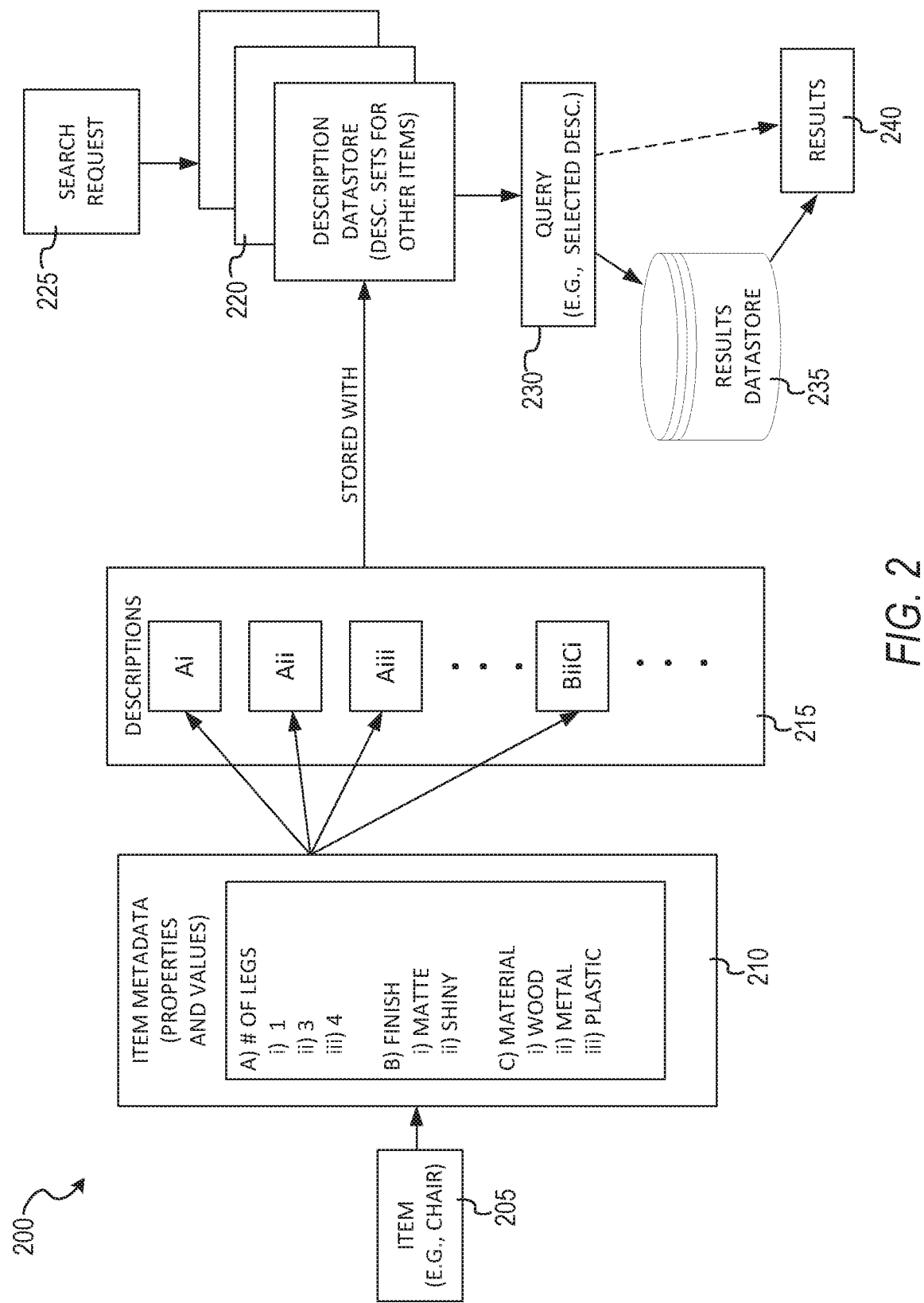
FIG. 2 shows an example data architecture for implementing a description search system, according to some example embodiments.

FIG. 2 shows an example data architecture 200 for implementing a description search system 150, according to some example embodiments. In FIG. 2, an item 205 is a thing to be searched for, such as a physical item (e.g., a lamp, a reciprocating saw, a computer), images, articles (e.g., online encyclopedia article), medical records (e.g., diseases), and so on. In some example embodiments, the items are data objects stored in results datastore 235 which can be displayed as search results.

The item 205 is associated with item metadata 210 including properties and their underlying values. A property is an attribute or characteristic used to describe the item. Properties can be of different types. For example, item 205 can be a chair and item metadata 210 can include a quantity of legs property ("A") with possible values including 1 leg, 3 legs, 4 legs; item metadata 210 can further include a finish type property ("B") with possible underlying values including matte and shiny; and item metadata 210 can further include a material type property ("C") with possible underlying values including wood, metal, and plastic.

In some example embodiments, the item metadata 210 of the item 205 is used to generate a plurality of descriptions 215, which are different combinations of the properties and underlying values. As an illustrative example, an itemized list of descriptions 215 generated using the description search system 150 can include:

A=i (one legged chair)
A=ii (three-legged chair)
A=iii (four-legged chair)
A=i, B=i (one legged chair with matte finish)
A=ii, B=i (three-legged chair with matte finish)
A=iii, B=i (four-legged chair with matte finish)
A=i, B=ii (one legged chair with shiny finish)
A=ii, B=ii (three-legged chair with shiny finish)
A=iii, B=ii (four-legged chair with shiny finish)
A=i, B=i, C=i (one legged wooden chair with matte finish), etc.

The descriptions 215 are stored with descriptions datastore 220 created for other items. For example, a set of descriptions can be generated for a table item type (e.g., number of legs, material, etc.), another set of descriptions can be generated for an electric tool type (e.g., properties including wattage, type, features, etc.), another set of descriptions can be generated for images (e.g., size, predominate colors, subject, etc.) blue images, red images, or anything to be searched and retrieved by the description search system 150.

In some example embodiments, the descriptions in the descriptions datastore 220 are not queries in that they have not yet been selected for use as a query. Instead, one or more of the descriptions can be selected as a query to be queried against a database in response to a search request received from a user. For example, a user may generate a search request 225 and the terms of the search request 225 can be processed to determine the closest matching descriptions in the descriptions datastore 220. Different types of matching schemes can be used to find which of the descriptions stored in the descriptions datastore match the terms in the search request, including for example: word comparison, token based searching (e.g., converting a given description into a token, then matching input search words to tokens generated from the descriptions), using an inverted index, reverse index, string-to-string comparison, letter-to-letter matching to find matching descriptions that are similar to the words in the query, and other matching schemes.

After a description is determined to be closest to the terms of the user-submitted search request 225, that description can be submitted as a query 230 against results datastore 235, which returns results 240 which can then be displayed on a user device of the user that created or otherwise input search request 225.

For example, assume the search request 225 includes the terms "matte chair single leg". These terms can then be compared to the descriptions in the descriptions datastore 220 to determine that "one-legged chair with matte finish" (generated from the property and value combination: A:i, B:i) most closely matches the terms of search request 225. Continuing the example, the description "one-legged chair with matte finish" is then submitted as the query 230 against the results datastore 235. The results 240 can include a webpage displaying a plurality of chairs options having matching properties that are browsable via a website which received the search request. In this way, the description search system 150 can decouple the search request 225 (the terms input by the user) from the query (the terms used to query a datastore).

Additionally, in some example embodiments, one or more of the descriptions can be pre-linked directly to one or more search results, as indicated by the dotted arrow from query 230 to results 240. For example, if the results are encyclopedia articles or medical records, upon a user selecting one of the descriptions from the descriptions datastore 220 the selected description is treated as query 230 and pre-linked results are displayed to the user without submitting the query to a datastore (e.g., querying a results datastore 235); or without using a search engine to determine which results are closest, instead, the pre-linked results are returned as results. Further detail example embodiments using pre-linked results are discussed below.

One advantage of the description search system 150 is that it enables the user to browse actual results of items in the database (since the descriptions are created from metadata of items in the database) instead of merely searching for them. For example, in conventional approaches, a user types in words without knowing what sort of items are available in the results datastore. In contrast, when "browsing" via the description search system 150, the user is choosing from what will dearly bring back appropriate answers from the results datastore. This can be advantageous in embodiments where perusing the closest matching descriptions can give insight into what the user is searching for (e.g., a doctor searching for the correct diagnosis among a plurality of possible diagnosis options).

Conventional search engines generally use searching, not browsing; the results that they find are stored as a big "bag of words", and the conventional engines attempt to return the best matching "bags" to the query sent. This approach is incongruent with online sites that store items of inventory, e.g., an online Fine Art store, as the online sites would prefer to let the user browse their inventory (as the user would if in a physical store) instead of merely submitting a query and "seeing what comes back", so to speak. Furthermore, site owners may not want to show an item as a result just because the item title or description happen to match a well-known category. For instance, the famous "this is not a pipe" painting by Marcel Duchamp is a painting, and it should not be shown for people who are simply searching for "pipe" (e.g., a tobacco pipe for smoking), merely because the terms are similar. However, removing a specific item from some search results while making it available for others is a difficult online search engine problem. The description search system 150 avoids this issue by generating descriptions from items in the results datastore (e.g., generating descriptions from combinations of item metadata of items in an inventory datastore).

An additional advantage of the description search system 150 is that by decoupling search requests terms from results computationally expensive free-text searches are avoided. This is advantageous because often the results datastore to be searched can be a very large dataset that require tiers of servers to handle search requests; and if all user search requests are treated as queries, then each search request creates a free-text search against the very large datastore, which creates significant computational overhead, large administrative and equipment costs, and further can yield poor end-user experiences (e.g., slow results). In contrast, the description search system 150 uses the user's search request against a description datastore (e.g., descriptions datastore 220), which is more light weight and can be accessed and searched far more rapidly than the items stored in the large datastore (e.g., results datastore 235).

Some conventional approaches attempt to resolve the problem of expensive superfluous free-text searches using auto-complete suggestions that are based on popular historic searches and/or boosted common user queries. However, these approaches are vulnerable to abuse by malicious network users. For example, a group of malicious users may try to high-jack auto-complete systems by submitting fake searches so that the auto-complete system erroneously suggests the fake searches instead of previous real user searches. For instance, a group of malicious users may submit the sentence: "John Smith is a liar", so that when other users input the word "John . . . " auto-complete erroneously suggests "John Smith is a liar" as a genuine popular search request. The description search system 150 avoids this network issue by generating combinations of descriptions from item metadata (e.g., properties of item classes and their underlying values), which are more concrete and difficult for malicious users to manipulate.

Further, by avoiding reliance on past data (e.g., past user searches, common queries, etc.), the description search system 150 can more readily be adapted to new environments. For example, if a website enters a new online marketplace in a different country having a different language, the description search system 150 does not need to gather past data from users in the different country (e.g., in that country's language) to enable auto-complete suggestions. For example, conventionally, if a system configured for English autocomplete (based on English past user data) is migrated to Germany, the system will have need to gather a multitude of past user data in the German language to provide useful autocomplete suggestions in the German speaking searching users. The description search system 150 avoids this by translating description set from English to Spanish term-for-term, or by generating a description set from scratch in German, both of which can be performed more rapidly than the conventional past user data-based approaches.

Figure 3:
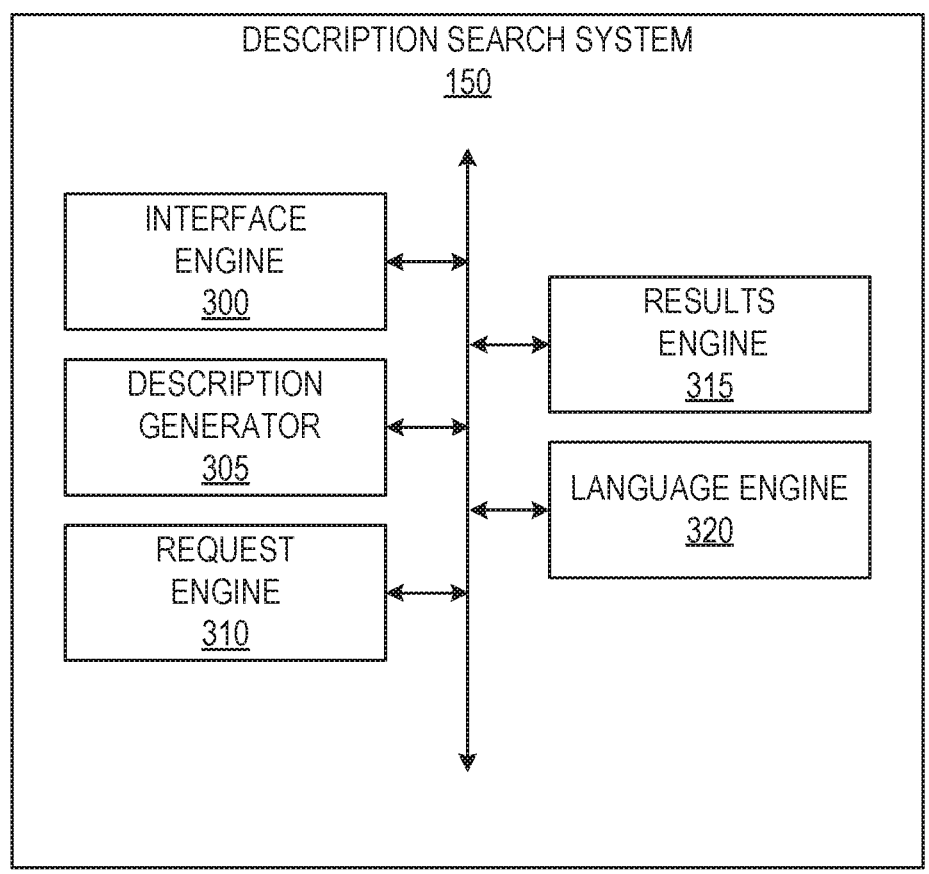
FIG. 3 shows internal functional components of a description search system, according to some example embodiments.

FIG. 3 shows example internal functional components of a description search system 150, according to some example embodiments. As illustrated, the description search system 150 comprises an interface engine 300, a description generator 305, a request engine 310, a results engine 315, and a language engine 320. The interface engine 300 is configured to generate user interfaces to interact with users (e.g., a search UI to receive search requests from users and display returned results). The description generator 305 is configured to identify item metadata (e.g., properties and their underlying values) of different items and generate descriptions from different combinations of item metadata. The request engine 310 is configured to receive a search request from users and identify one or more descriptions that most closely match the terms in the search request. The results engine 315 manages returning results using the one or more descriptions identified by the request engine 310. For instance, in some example embodiments, the result engine 315 is configured to query a database using the matching one or more descriptions as identified by the request engine 310. In some example embodiments, the results engine 315 includes a search engine (E.g., inverted index, bag of words scheme, semantics based search engine, a search engine plugin, a recursive neural network based predictive search engine that updates per each word input the user, etc.) that returns results by searching against a results data store using one or more of the variation descriptions that match user's search request. Further, in some example embodiments, the results engine 315 uses the one or more identified descriptions to return pre-linked results (e.g., without searching), as discussed in further detail below. The language engine 320 is configured to generate description sets in different languages from initial description set that is in an initial language, as discussed in further detail below.

Figure 4:
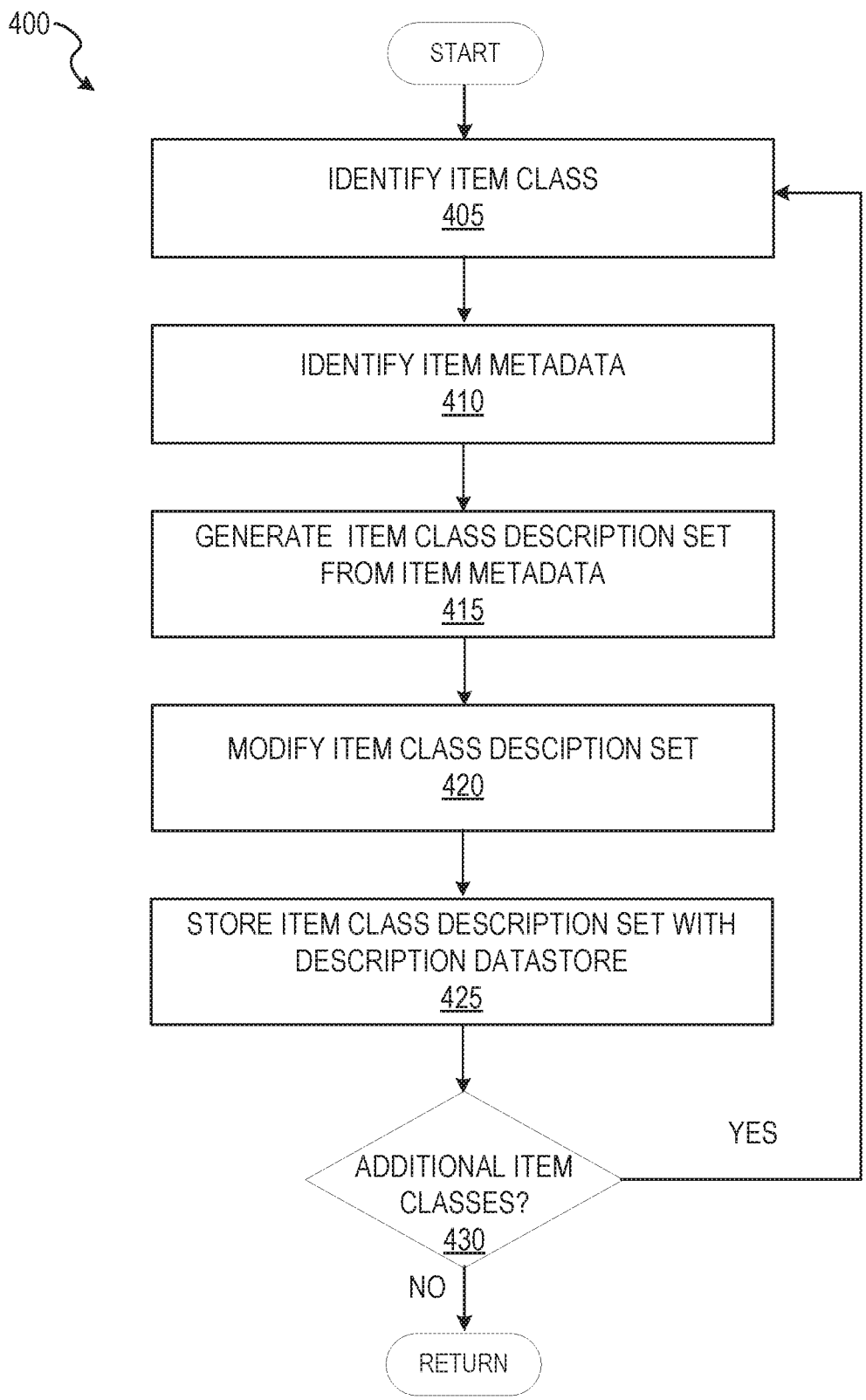
FIG. 4 shows a flow diagram of an example method for generating description sets, according to some example embodiments.

FIG. 4 shows a flow diagram of an example method 400 for generating description sets for different item classes, according to some example embodiments. At operation 405, the description generator 305 identifies an item class (e.g., a chair item class). At operation 410, the description generator 305 identifies item metadata of the item class, such as properties and their underlying values of the identified item class. At operation 415, the description generator 305 generates an item class description set from the item metadata. For example, at operation 415, the description generator 305 generates different descriptions from different combinations of the properties and property values of the item class. The descriptions can be generated using different mechanisms. For example, according to some example embodiments, the descriptions are created by generating every combination of properties and underlying values (e.g., one property and its underlying values, two properties and their respective underlying value combinations, etc.). Additionally, in some example embodiments in which the order of terms in the descriptions is important, the descriptions are created by generating every permutation of properties and underlying values (e.g., "black chair" would be a different description than "chair black"). In some example embodiments, each of the descriptions may be manually curated through a user interface. For example, a user may be presented with a user interface that displays various property and value options for a given item, and the user may rapidly generate different descriptions by explicitly selecting individual properties or values to be included in a given description. In some example embodiments, instead of generating descriptions by exhausting all possible combinations/permutations, the descriptions are generated using only pre-selected values. The pre-selection approach may be useful in the case where some properties are more important than others for a given item class. For example, if the item is a screwdriver, the property of "screwdriver type" may be important (with possible underlying values of "Philips head", "flathead", "Torx"®, etc.) whereas the color property may not be important (e.g., to a user, the difference between a black or red colored screwdriver may be inconsequential). In this example, the screwdriver type property may be selected to be included in description generation and the color property may be left unselected, thereby creating more useful descriptions. Further, in some example embodiments, the descriptions may be augmented by additional language and templates, as discussed in further detail below.

At operation 420, the description generator 305 modifies the item class description set, as discussed in further detail below with reference to FIG. 5. At operation 425, the description generator 305 stores the generated item class description set in a description datastore (e.g., descriptions datastore 220). At operation 430, the description generator 305 determines whether there are additional item classes for which to generate additional description sets. If there are additional item classes, the description generator 305 loops through operations 405 through 425 for each of the additional item classes. If there are no additional item classes, the method 400 ends or returns.

One feature of the method 400 is that it allows for new items to be rapidly added to the description-based search system. For example, when a new item of inventory is received, item metadata can be generated for the new item, then descriptions can be generated using different combinations, then the new set can be stored with the description datastore.

Figure 5:
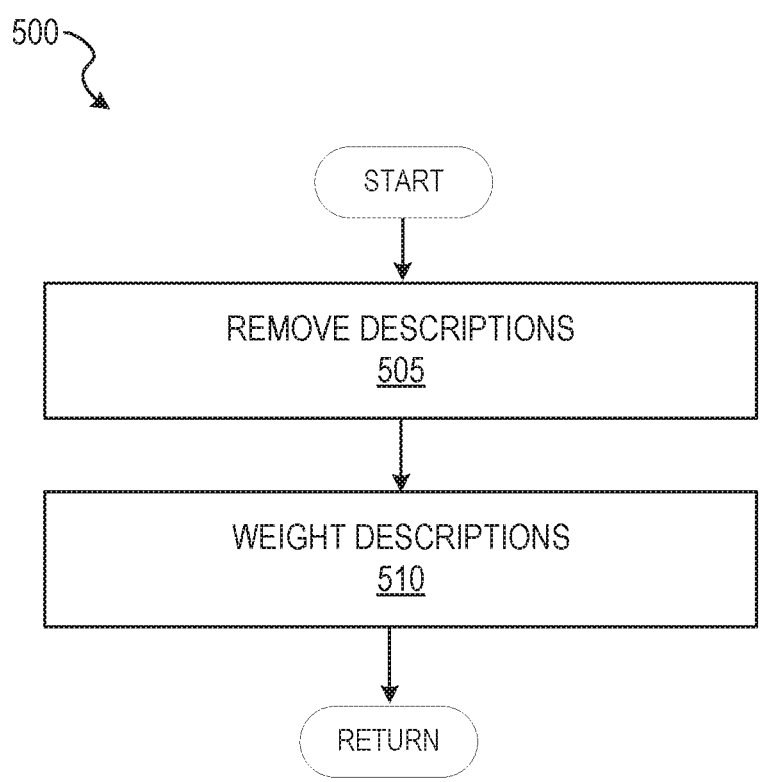
FIG. 5 shows a flow diagram of a method for modifying a description set, according to some example embodiments.

FIG. 5 shows a flow diagram of a method 500 for modifying the generated description set, according to some example embodiments. In some example embodiments, the method 500 can be configured as a subroutine of operation 420 in FIG. 4. At operation 505, the description generator 305 removes one or more descriptions. For example, in the case where the descriptions are generated by exhausting all combinations of properties and underlying values, an administrative user may instruct description generator 305 (e.g., a UI generated by the description generator 305) to remove descriptions that do not make sense or are irrelevant. Additionally, one or more descriptions may be removed based on other considerations, such as low or no inventory or seasonality (e.g., removing "sun umbrella" descriptions during winter). In some example embodiments, a set of removal rules (e.g., trigger conditions, if/then statements, heuristics) are stored in memory accessible to the description generator, and at operation 505 the description generator 305 uses the stored rules to cull the description set. The stored rules can be preconfigured before method 500 and can be updated when new types of errors are encountered (e.g., a administrative user noticing the descriptions are inaccurate, such as a seasonal/weather inaccuracy, and creates a new rule to include in the stored rules of the description generator).

At operation 510, the description generator 305 weights descriptions. For example, the description generator 305 can boost the weighting of one or more descriptions so that they are more likely to be selected as matching the terms in the user search request. For instance, a new inventory item (e.g., item class) can be promoted by boosting the weightings of descriptions generated for the new item inventory item versus other description sets from other items. Alternatively, if one or more items are low in inventory, the weightings of their corresponding descriptions can be lowered thereby guiding users towards browsing of items (i.e., item descriptions) that have adequate inventory. In contrast to past approaches which use search engines to find whichever results are closest to the search terms, the method 500 can more efficiently be managed as the set of descriptions is a closed set of conditions that are low in quantity due to the combinations of the item metadata resulting in a manageable set of combinations or permutations. In this way, whereas administrators implementing conventional approaches expend considerable resources to manage heuristics and weightings for open ended search system, an administrator managing the description search system 150 can efficiently change how the closed set of descriptions search via method 500.

Figure 6:
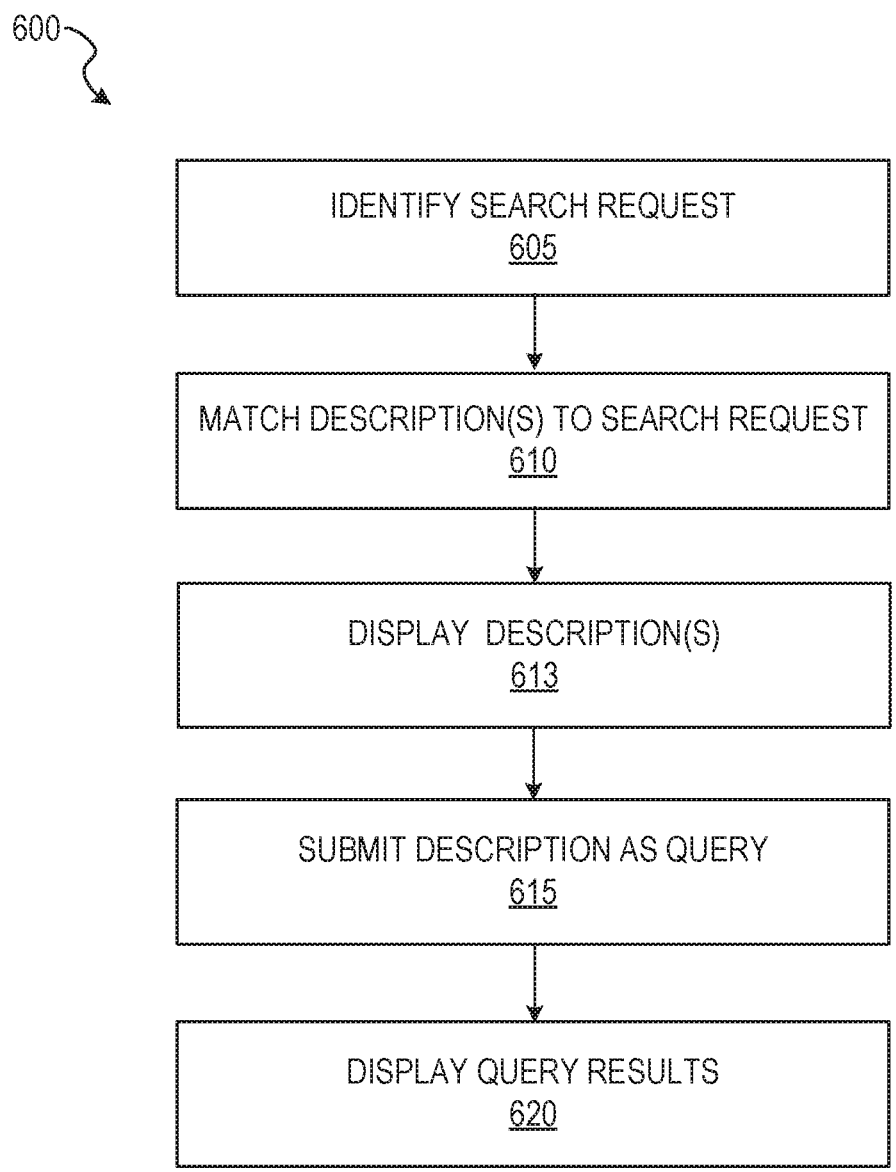
FIG. 6 shows a flow diagram of a method for returning results for a search request, according to some example embodiments.

FIG. 6 shows a flow diagram of a method 600 for returning results for a search request, according to some example embodiments. At operation 605, the request engine 310 identifies a search request. For example, a user may have submitted one or more terms as a search request input into a search bar of a user interface generated by the interface engine 300. At operation 610, the request engine 310 matches the received search request to one or more descriptions in a descriptions datastore (e.g., descriptions datastore 220 comprising multiple sets of description sets, each of which are generated for a different item or item class).

At operation 613, one or more matching descriptions are displayed to the user as suggestions (e.g., non past-data based auto-complete suggestions). In some example embodiments, operation 613 is omitted and the top matching description is selected. At operation 615, the results engine 315 submits the one or more matching descriptions as a query to a database. In some example embodiments, the description that most matches is automatically submitted as the query for submission to the database. To the searching user, it will appear as if their actual search terms were submitted to a search engine or database, whereas behind the scenes, their search term was matched to a top ranking description, and the top ranking description was submitted to the search engine or database.

At operation 620, the interface engine 300 displays the query results as results the search request received at operation 605. Further, in some example embodiments, one or more of the descriptions can be pre-linked to a certain search result or set of search results. For example, inputting "Alan Parker Fame 1980" may display a plurality of description based auto-complete suggestions, including some descriptions generated for the Alan Parker movie "Fame" and other descriptions that are not about the Alan Parker "Fame" but nonetheless have terms that match the search request (e.g., another Alan Parker movie made circa 1980). In this example embodiments, if the user selects any of the descriptions generated from the "Fame" item description set (i.e., the description set generated from the "Fame" item), the user navigates to the same page: a web-article for the 1980 movie "Fame". That is, the web-article has been pre-linked to all of the generated descriptions that mention the term "Fame", and upon any of the descriptions comprising that term are selected, no search occurs and instead the web-article for the 1980 movie "Fame" is rapidly returned and displayed on the user's device.

Figure 7:
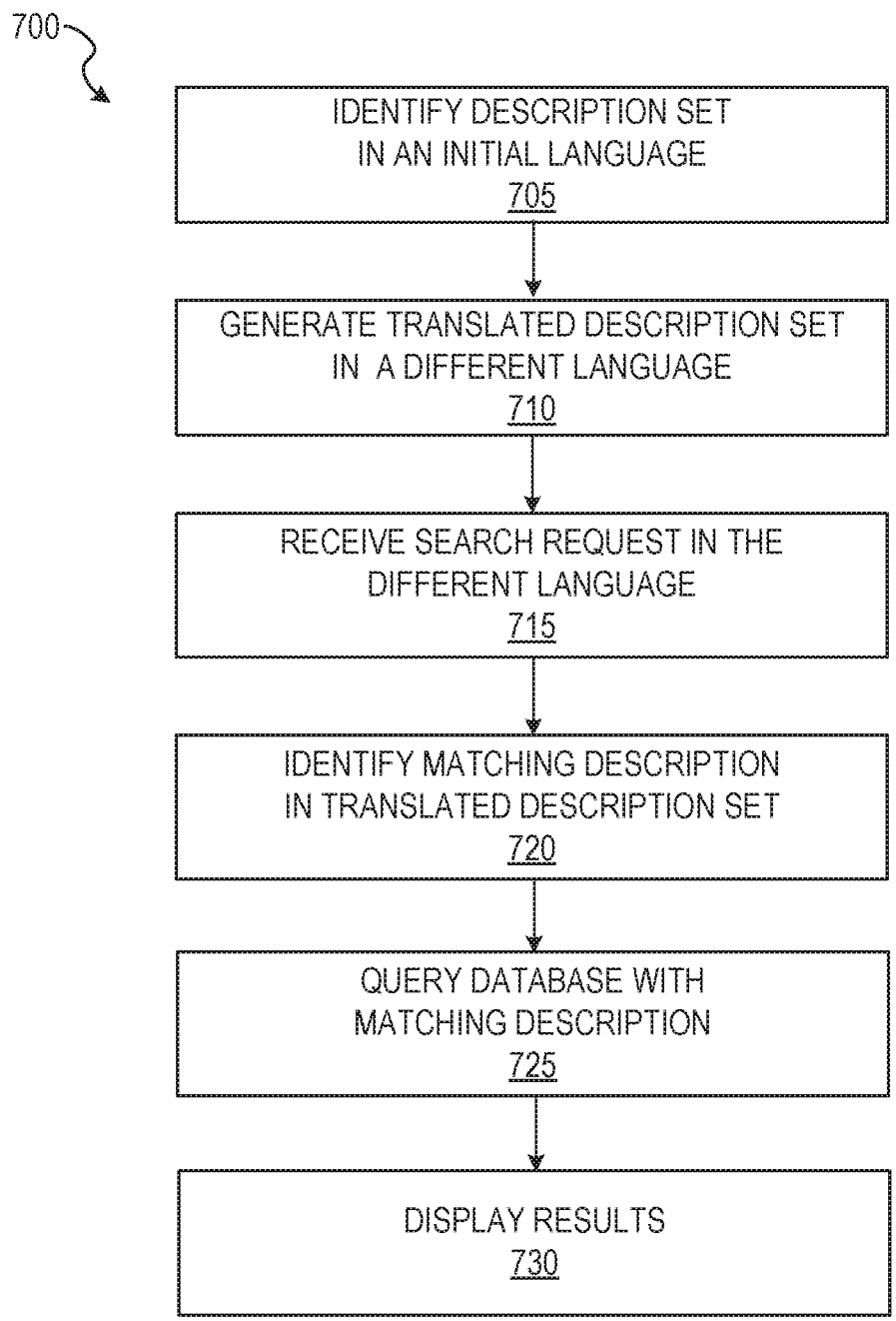
FIG. 7 shows a flow diagram of a method for generating description sets in different languages using an initial description set, according to some example embodiments.

FIG. 7 shows a flow diagram of a method 700 for generating description sets in different languages using an initial description set, according to some example embodiments. At operation 705, the language engine 320 identifies a description set in an initial language, such as English. At operation 710, the language engine 320 generates a translated description set in a different language, such as Spanish. For example, at operation 710 the language engine 320 generates a translated description set by converting the English terms in the initial description set (which are English) to Spanish terms. In some example embodiments, the translation occurs word-for-word for each description. In other embodiments, a translation program is used to translate descriptions as entire sentences. The translation program can be an off the self-program that is integrated as a plugin into the language engine 320. In this way, by translating descriptions as entire sentences, the translated description set can be more accurately generated for languages that change the order of sentence parts (e.g., blue pants in English will translate to pantalones azules in Spanish).

At operation 715, the interface engine 300 receives a search request in the different language. For example, a Spanish user enters a search request in Spanish in a search bar of a website. At operation 720, the request engine 310 identifies a match description in the translated description set by determining which of the descriptions in the translated set best match the terms in the received search request. At operation 725, the results engine 315 queries a database using the matching description (e.g., a relational database query, a open-ended search engine search request). At operation 730, the interface engine 300 displays query results. For example, at operation 730 the interface engine 300 displays query results as web-page product items, where the descriptions of the product items and their corresponding web-pages are all the same language as the search request received at operation 715.

In some example embodiments, the description search system 150 creates description sets for each language from scratch. That is, instead of converting the English description set to a German description set using language engine 320, it may be faster or more practical for the description search system 150 to generate properties and underlying values in German and generate combinations of the properties and values to create different descriptions, as discussed above with reference to FIG. 4.

Although in some of the examples above the description search system 150 is configured to perform description-based searches on items of a network site, it is appreciated that the description search system 150 can likewise be implemented in different types of environments. In some example embodiments, the description search system 150 is configured to perform article searching, e.g., encyclopedia searches where the searched items is a closed set of results that are rarely updated (e.g., yearly). In the article searching context, an item class (e.g., item 205, FIG. 2) corresponds to a subject of an article. For example, a first example item can be Carl Philipp Emanuel Bach (son of Johann Sebastian Bach), a second item can be "Fame" (a movie made in 1980). Further, in this example, the properties of the item/subjects can be any attribute, fact, or term that describes the subject. For the first item/subject of "Carl Philipp Emanuel Bach", the properties can be manually curated by an administrative user and include: "CPE Bach" (a common abbreviation the subject's name), "Son of Bach", "1714" (CPE Bach's date of birth), "classical-era composer", and so on, from which descriptions including "CPE Bach, son of JS Bach" CPE Bach, classical-era composer, CPE Bach, born 1714, CPE Bach, composer of Adagio for string orchestra in B minor" can be generated and stored in the description set (e.g., descriptions datastore 220). The second item properties for the movie fame can include: "1980", "Alan Parker", "teen musical", "drama", and so on, from which descriptions including "Fame 1980 film", "Alan Parker movie Fame", and "Fame, teen musical drama film" can be generated and store with the description datastore (e.g., descriptions datastore 220).

In some example embodiments, the descriptions created from different combinations of properties and values can be augmented by additional area terms (e.g., jargon, terms of art specific to a knowledge area or study) that provides additional insight and context and improves readability of the descriptions. The area terms can be included in templates into which different combinations of properties and values can be inserted. For example, in a health/medical based description terms-of-art embodiment, each item (e.g., item 205) can be aspects related to diagnosis of a patient. For example, a "drug" item can include the following properties: conditions for which it is treated, cross-drug usage for treatments, cross-drug interferences, side effects, drug sensitivities, and so on, each of which may have one or more underlying values. An example "treatment" item can include the following properties: conditions for which it is treated, drug treatment associated with it, side-effect conditions of treatment, and so on. Further, an example "medical condition" item can include the following properties: preliminary, intermediate and advanced symptoms; preliminary, intermediate, and advanced medical treatments and drugs; and ethnic, sexual orientation, age range, and other attributes associated with the condition; and so on.

The templates can include terms that explain the causal or observed relations between treatments, drugs and conditions. Example additional language templates can include:
[symptom] in [population group] typical of [medical condition]
[drug] treatment for [medical condition] in [population group] showing [symptoms]
[side effect 1], [side effect 2], [ . . . ] after taking [drug]

[medical condition] treated using [drug]
where the terms in brackets are properties into which values can be populated and the words outside the brackets are the additional language of the template.

Example descriptions having values integrated with the additional language can include:
"Delayed motoric skills in young infants among Jewish due to Tay Sachs disease"
"Ibuprofen 400 treatment for Migraine without Headache in middle-aged female"
"Abdomen rash following use of Amoxicillin"
"Rosacea treated using Doxycycline"

In this example embodiment, at the time of diagnosis (e.g., in office patient visit), the healthcare expert (e.g., General Practitioner doctor) can input the keywords they believe are relevant to the patient's case, such as the symptoms, drug names, past or current diseases, and the system matches the keywords to the most relevant suggested descriptions. By reviewing the suggested descriptions and variations of cases, they can rapidly narrow down to the most relevant description (e.g., diagnosis), while interacting with the patient in-office to further explore the condition (such as asking about past diseases, ethnic correlation, based on the generated descriptions). In some example embodiments, the one or more of the descriptions are pre-linked to a certain symptom (e.g., article page describing the symptoms), while in other embodiments a selected description can then be used as a query against a database, as discussed above with reference to FIG. 2.

The potential benefit of pre-linking descriptions with results is that the administrator of the description search system 150 may seek to have the browse experience provided by the descriptions but not risk the chance of irrelevant results being retrieved in the query process. In the medical context, administrative users having medical expertise may know beforehand that certain descriptions should link to certain pages and may create such linkages manually, thereby avoiding false diagnosis from generated descriptions.

The use of description variation, as opposed to simply submitting the keywords into a search engine and hoping for some articles to match, is that the sentence structure is in a concise and meaningful form, allowing no room for misinterpretation. For example, plain text search for "rash doxycycline" will retrieve a mix of articles, where Doxycycline is used to either cure a rash or happens to cause a rash. The results may be very large and include many repeats. When observed from a description generation approach, the descriptions inherently address the case where a medical treatment using Doxycycline caused certain side-effect, versus the case where Doxycycline was used to treat Rosacea-type facial rash. By choosing a result from a list, the expert can access a User Interface (e.g., search user interface with a text field bar for term entry), that shows additional options relating to the drug, treatment or condition, allowing further research after a primary filter is done. It is therefore a quick and meaningful method for honing into a medical facts database, which can be immense and difficult for even well-trained professional to navigate efficiently.

Figure 8:
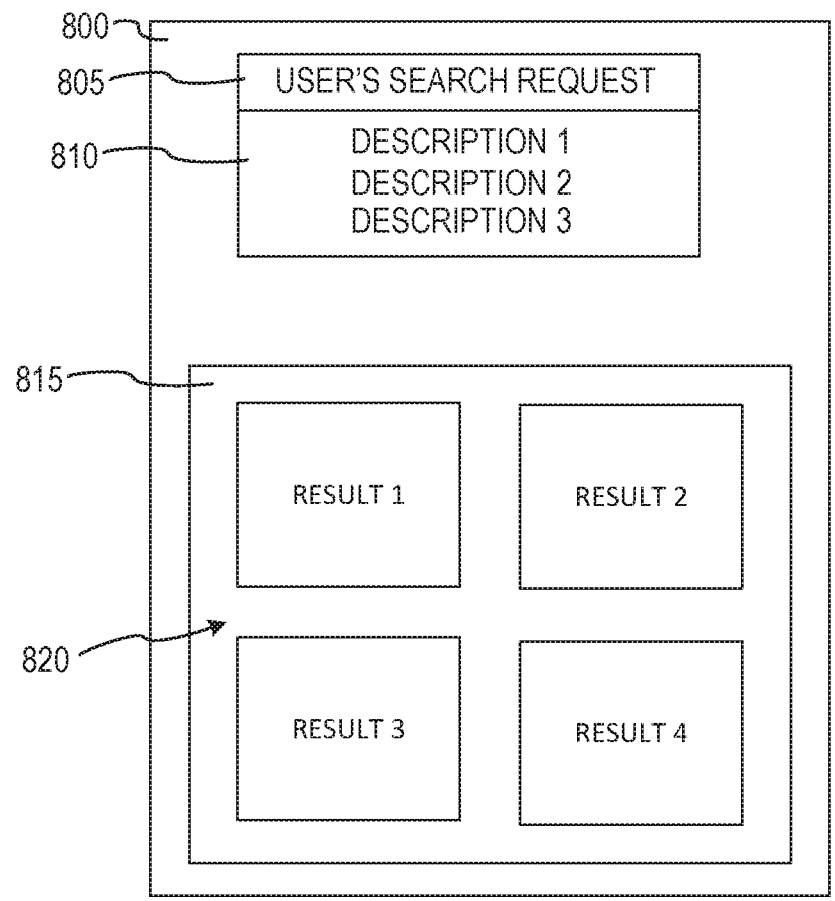
FIG. 8 shows an example user interface, according to some example embodiments.

FIG. 8 shows an example user interface 800 for description based searches, according to some example embodiments. The user interface 800 is displayed on a screen of a user device (e.g., client device displaying a mobile application screen, a web-browser displaying a website with different products or encyclopedia articles, a movie website ratings website, a medical search system, etc.). The user interface 800 comprises a search element 805 into which a search user inputs one or more words of a search request. The search request is used to generate matching descriptions displayed in the descriptions element 810. For example, the descriptions element 810 can be a drop-down element that extends from the search element 805 to display descriptions-based auto-complete results (non-past user data based auto-complete results). In some example embodiments, the descriptions element 810 is not displayed and upon pressing the "Enter" or search button of the device, the input terms are matched to descriptions and the top ranking description or a set of the top ranking descriptions (e.g., top n descriptions) are used as search engine queries.

The user interface 800 further comprises a results area 815 in which a plurality of results 1-4 are displayed. In some example embodiments, the results are identified by using a description as a search term in a search engine, while in other example embodiments the results are identified via pre-linking to one or more of the descriptions, as discussed above.

Figure 9:
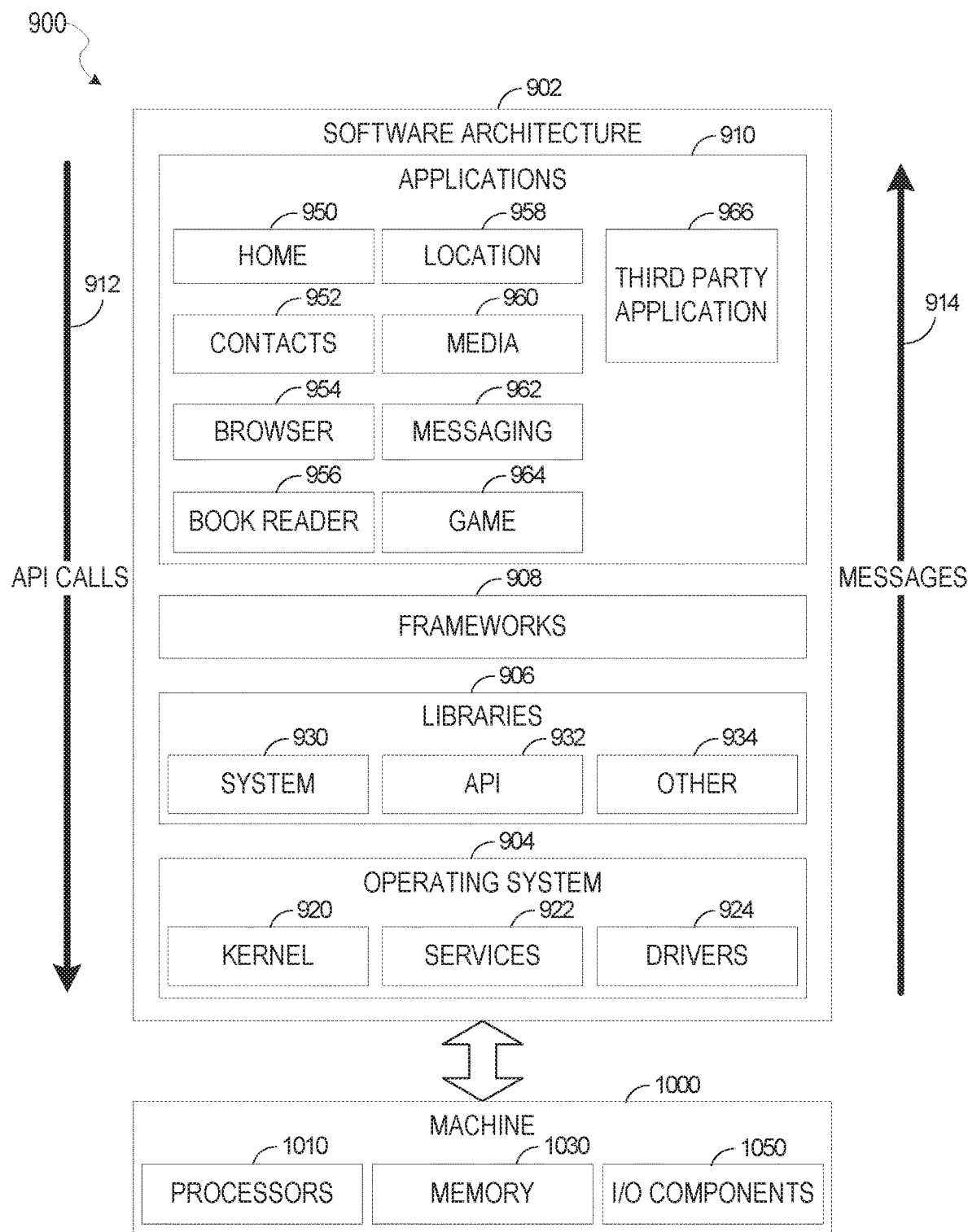
FIG. 9 is a block diagram illustrating a representative software architecture, which may be used in conjunction with various hardware architectures herein described.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
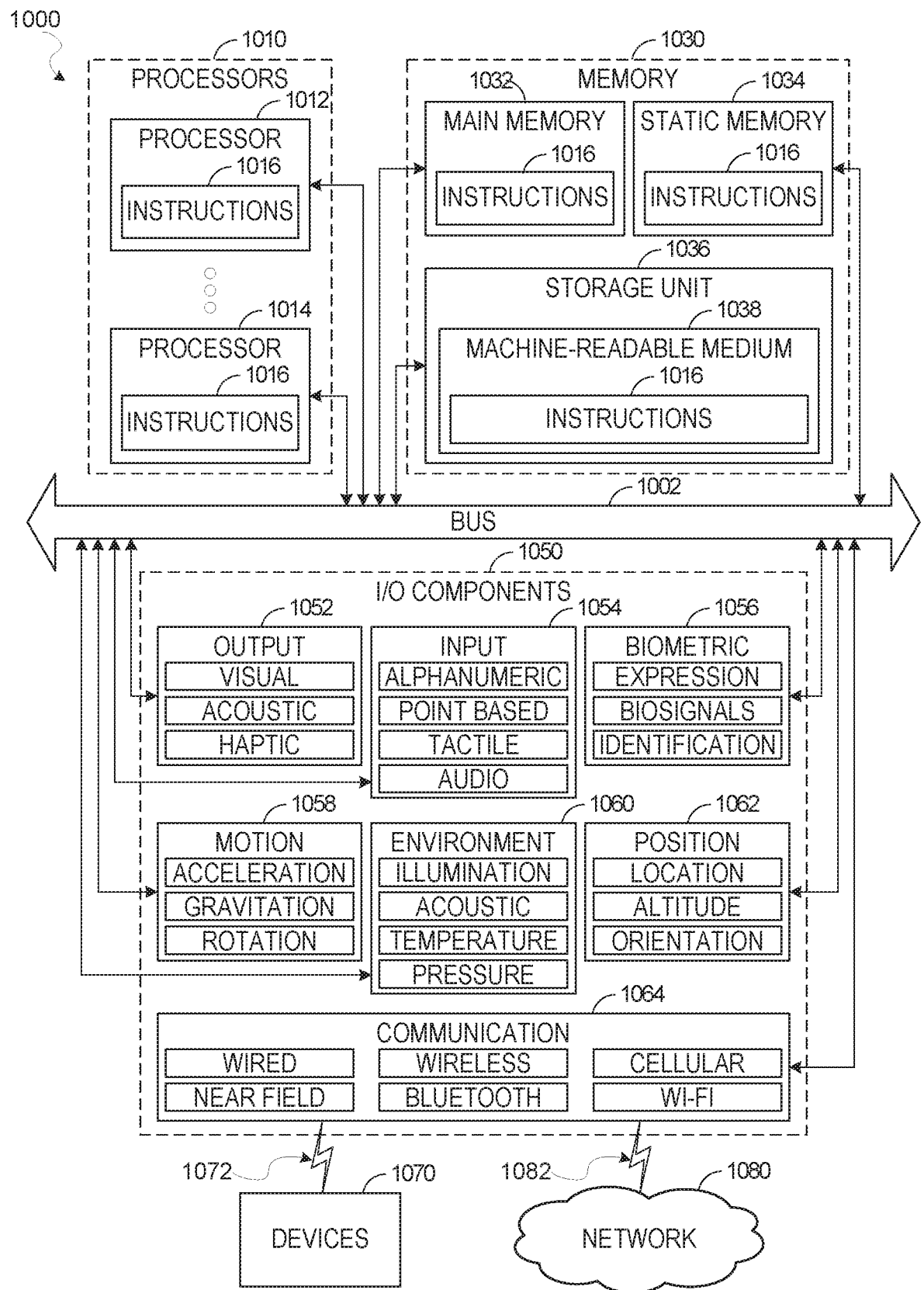
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, both accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method comprising:
identifying a search request including one or more words describing an item, the search request being input into a user interface element of a user device;
generating a variation descriptions set that match the one or more words of the search request, the variation descriptions set generated from combinations of a plurality of pre-specified attributes of the item such that a first portion of the variation descriptions set includes pre-specified attributes that are uncommon with each pre-specified attribute in a second portion of the variations descriptions set;
generating one or more result items by searching, using a search engine, a results datastore using one or more of the variation descriptions set; and
causing, on the user device, a presentation displaying the one or more result items generated by searching the results datastore.

2. The method of claim 1, wherein each of the pre-specified attributes of the item have a plurality of pre-specified underlying values.

3. The method of claim 2, further comprising:
storing item metadata for the item, the item metadata including a plurality of attributes for the item and a plurality of underlying values for each attribute of the plurality of attributes.

4. The method of claim 3, wherein the plurality of pre-specified attributes and the plurality of pre-specified underlying values are pre-specified in that they are stored and then generated by combining the stored attributes and stored underlying values in different combinations.

5. The method of claim 4, wherein combining the stored attributes and stored underlying values comprises:
generating a list of every combination of stored attributes and stored underlying values.

6. The method of claim 5, wherein the list of every combination is order specific in that permutations of stored attributes and stored underlying values are stored as separate variation description of the item.

7. The method of claim 1, wherein generating the variation descriptions set comprises:
matching the one or more words to the variation descriptions set using a matching scheme.

8. The method of claim 7, wherein the matching scheme includes at least one of: an inverted index matching scheme, a string-to-string comparison matching scheme.

9. The method of claim 1, wherein the search engine is a semantics based search engine.

10. The method of claim 1, wherein user interface element is a search input field in a user interface of a network site.

11. A system comprising:
one or more processors of a machine; and
a memory storing instructions that, when executed by the one or more processors, cause the machine to perform operations comprising:
identifying a search request including one or more words describing an item, the search request being input into a user interface element of a user device;
generating a variation descriptions set that match the one or more words of the search request, the variation descriptions set generated from combinations of a plurality of pre-specified attributes of the item such that a first portion of the variation descriptions set includes pre-specified attributes that are uncommon with each pre-specified attribute in a second portion of the variations descriptions set;
generating one or more result items by searching, using a search engine, a results datastore using one or more of the variation descriptions set; and
causing, on the user device, a presentation displaying the one or more result items generated by searching the results datastore.

12. The system of claim 11, wherein each of the pre-specified attributes of the item have a plurality of pre-specified underlying values.

13. The system of claim 12, the operations further comprising:
storing item metadata for the item, the item metadata including a plurality of attributes for the item and a plurality of underlying values for each attribute of the plurality of attributes.

14. The system of claim 13, wherein the plurality of pre-specified attributes and the plurality of pre-specified underlying values are pre-specified in that they are stored and then generated by combining the stored attributes and stored underlying values in different combinations.

15. The system of claim 14, wherein combining the stored attributes and stored underlying values comprises:
generating a list of every combination of stored attributes and stored underlying values.

16. The system of claim 15, wherein the list of every combination is order specific in that permutations of stored attributes and stored underlying values are stored as separate variation description of the item.

17. The system of claim 11, wherein generating the variation descriptions set comprises:
matching the one or more words to the variation descriptions set using a matching scheme.

18. The system of claim 17, wherein the matching scheme includes at least one of:
an inverted index matching scheme, a string-to-string comparison matching scheme.

19. The system of claim 11, wherein user interface element is a search input field in a user interface of a network site.

20. A machine-readable storage device embodying instructions that, when executed by a machine, cause the machine to perform operations comprising:
- identifying a search request including one or more words describing an item, the search request being input into a user interface element of a user device;
- generating a variation descriptions set that match the one or more words of the search request, the variation descriptions set generated from combinations of a plurality of pre-specified attributes of the item such that a first portion of the variation descriptions set includes pre-specified attributes that are uncommon with each pre-specified attribute in a second portion of the variations descriptions set;
- generating one or more result items by searching, using a search engine, a results datastore using one or more of the variation descriptions set; and
- causing, on the user device, a presentation displaying the one or more result items generated by searching the results datastore.

\* \* \* \* \*